United States Patent [19]
Berkers et al.

[11] Patent Number: 5,590,995
[45] Date of Patent: Jan. 7, 1997

[54] CONVEYING RAIL SYSTEM FOR A TROLLY

[75] Inventors: Antonius J. H. Berkers, Heeze; Johannes F. G. Smits, Helmond; Antonius A. P. Van De Ven, Eindhoven, all of Netherlands

[73] Assignee: Vanderlande Industries Nederland B.V., Veghel, Netherlands

[21] Appl. No.: 358,944

[22] Filed: Dec. 19, 1994

[30] Foreign Application Priority Data

Dec. 20, 1993 [NL] Netherlands ............................ 9302211

[51] Int. Cl.⁶ .................................................. B15G 67/24
[52] U.S. Cl. ........................ 414/357; 104/165; 104/168
[58] Field of Search ................................... 414/381–389, 414/354–358, 376, 519; 198/359, 368, 370.01, 370.04; 104/165, 168

[56] References Cited

U.S. PATENT DOCUMENTS

| | | | |
|---|---|---|---|
| 282,125 | 7/1883 | Simar et al. ............................ | 414/357 |
| 1,016,570 | 2/1912 | Lawton .................................. | 414/384 |
| 1,135,669 | 4/1915 | Culemeyer ............................. | 414/357 |
| 1,491,060 | 4/1924 | O'Toole ................................. | 414/357 |
| 1,716,240 | 6/1929 | Postweiler ........................ | 414/357 X |
| 2,290,844 | 7/1942 | Smith ............................... | 414/385 X |
| 3,013,499 | 12/1961 | Hubert ............................... | 104/165 X |
| 3,752,334 | 8/1973 | Robinson, Jr. et al. ............... | 414/357 |
| 3,768,624 | 10/1973 | Kornylak .......................... | 104/165 X |
| 3,818,839 | 6/1974 | Armstrong ............................ | 104/168 |
| 3,880,751 | 4/1975 | Wirth ..................................... | 198/359 |
| 3,994,405 | 11/1976 | Krivec .................................. | 414/384 |
| 4,063,656 | 12/1977 | Lambert ................................ | 414/384 |
| 4,415,303 | 11/1983 | Westendorf et al. .................. | 414/519 |
| 4,665,832 | 5/1987 | Kobayashi et al. .................... | 104/165 |
| 4,712,484 | 12/1987 | Sticht ..................................... | 104/165 |
| 4,718,349 | 1/1988 | Wahren .................................. | 104/165 |
| 5,445,081 | 8/1995 | Kunczynski .......................... | 104/165 |

FOREIGN PATENT DOCUMENTS

| | | |
|---|---|---|
| 0367972 | 5/1990 | European Pat. Off. . |
| 1051895 | 3/1959 | Germany . |
| 3443827 | 6/1985 | Germany . |
| 4210925 | 10/1993 | Germany . |
| 992371 | 2/1983 | U.S.S.R. ............... 414/354 |
| 1025625 | 6/1983 | U.S.S.R. ............... 414/354 |
| 1636308 | 3/1991 | U.S.S.R. ............... 414/382 |
| 2170159 | 7/1986 | United Kingdom . |

Primary Examiner—David A. Bucci
Attorney, Agent, or Firm—Oblon, Spivak, McClelland, Maier & Neustadt, P.C.

[57] ABSTRACT

A conveying system provided with a rail system, with a trolley or the like, which is movable along the rail system, and with a switch device, by which a trolley can be diverted from one rail track to another rail track connected to the first rail track. The trolley or the like is provided with two guides, which are arranged some distance apart and which cooperate during operation with a fixed guide extending in the longitudinal direction of a rail track. The trolley is furthermore provided with two further guides, which are arranged some distance apart and which are furthermore arranged in staggered relationship with respect to each other, transversely to the intended direction of movement, for cooperation with the guides, which form part of the switch device, for diverting the trolley from one rail track to the other, which guides are disposed near the connection between the two rail tracks.

14 Claims, 13 Drawing Sheets

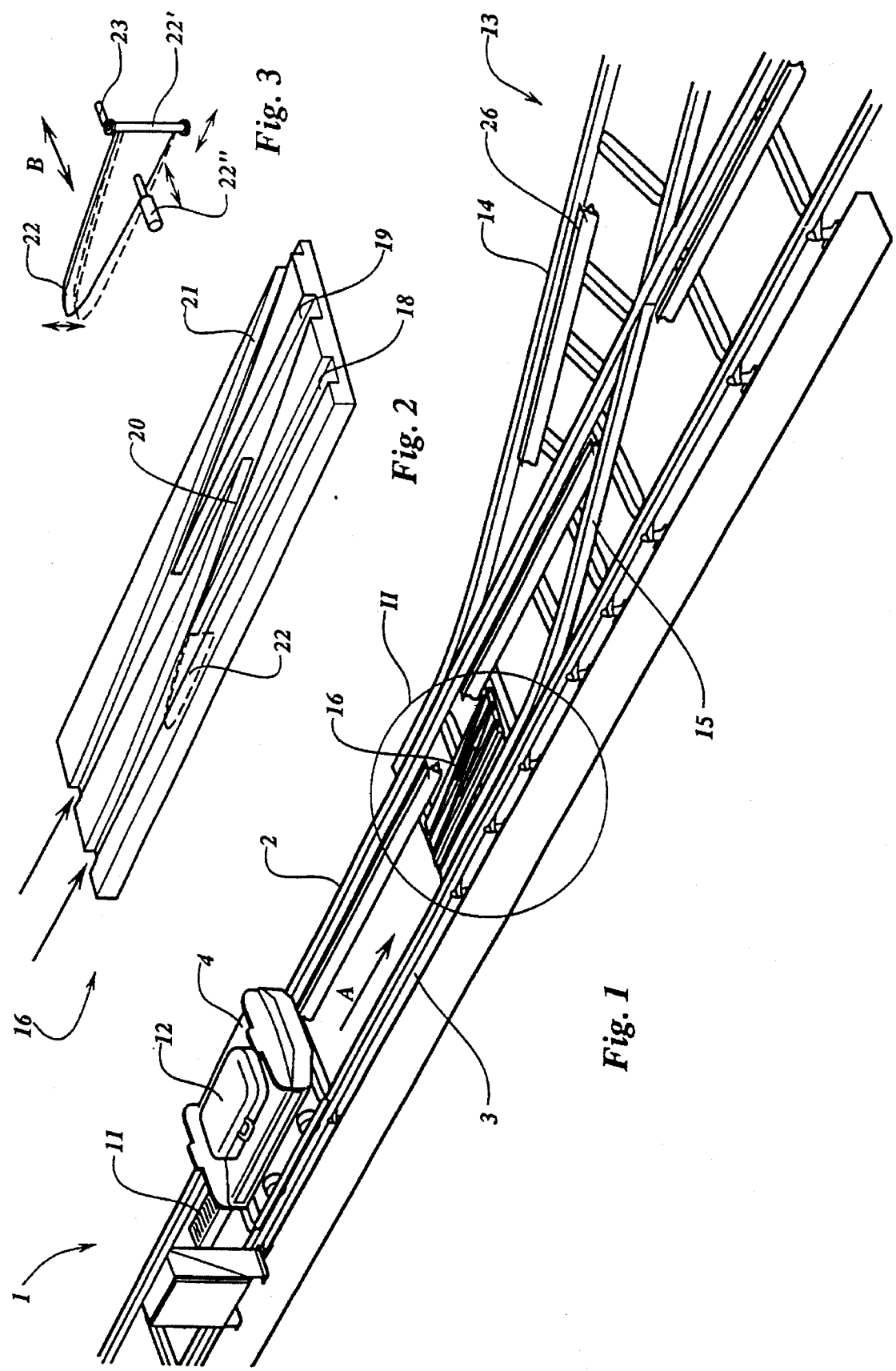

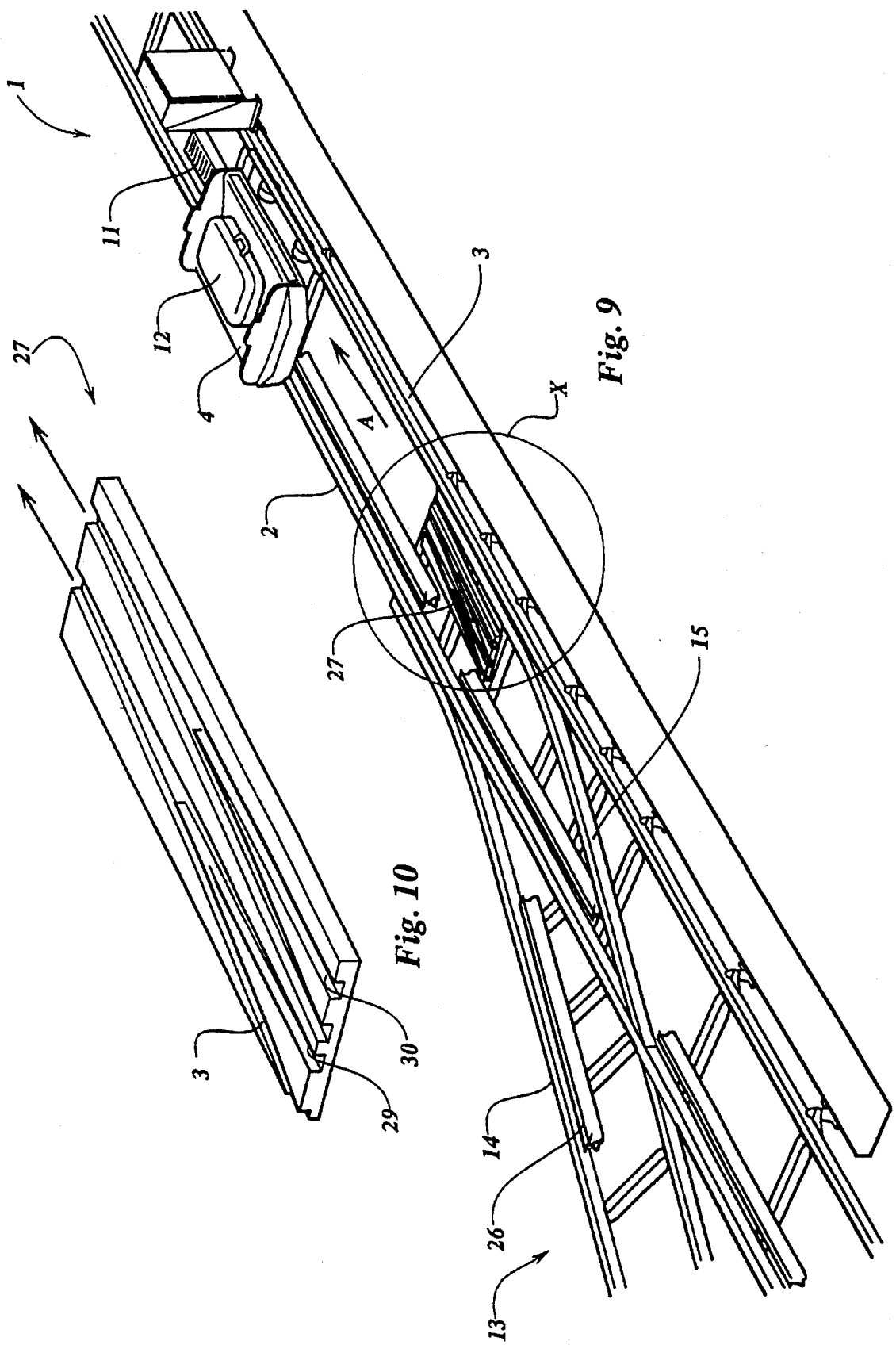

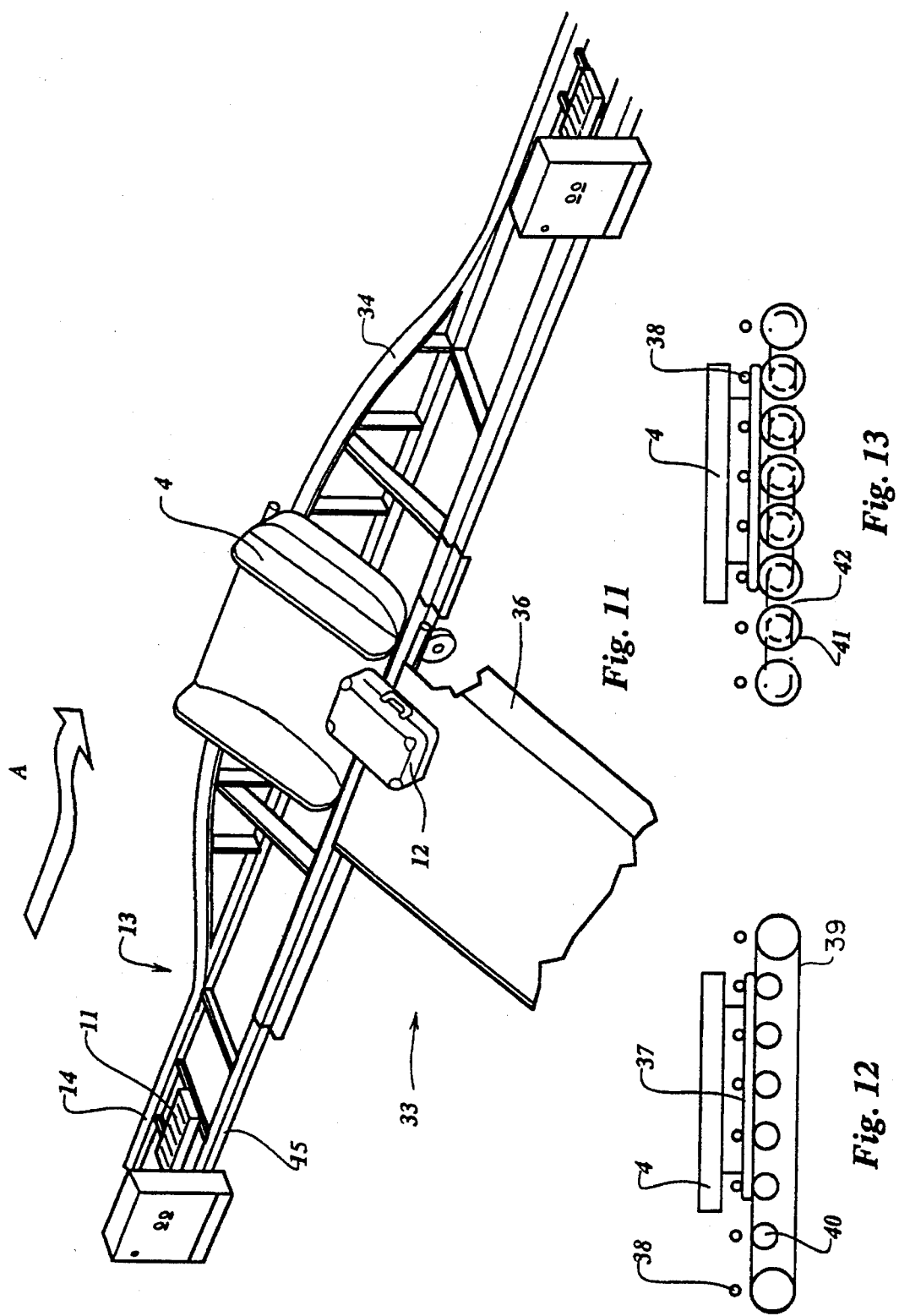

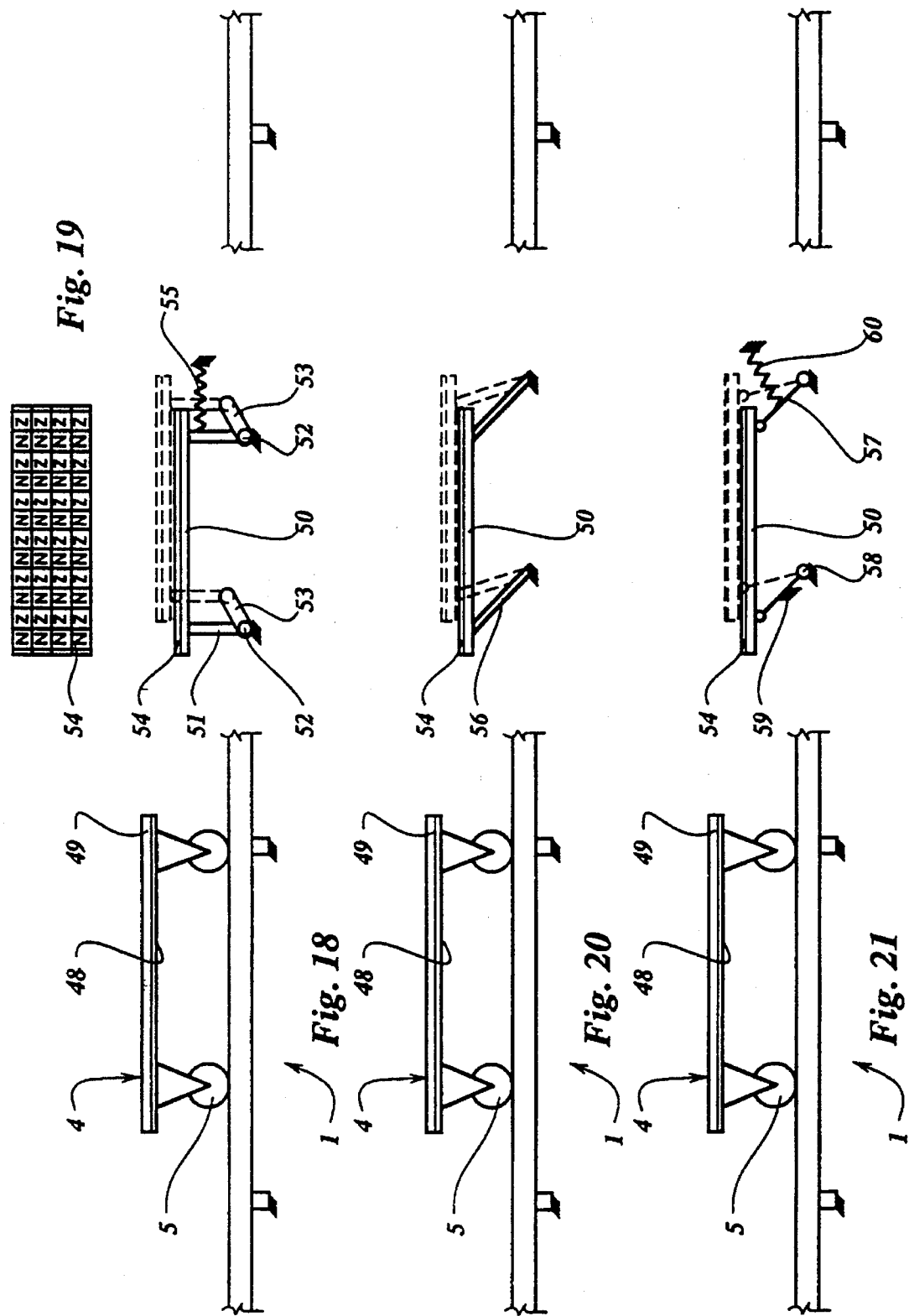

CONVEYING RAIL SYSTEM FOR A TROLLY

BACKGROUND OF THE INVENTION

Field of the Invention

The invention relates to a conveying system provided with a rail system, with a trolley or the like, which is movable along said rail system, and with a switch device, by means of which a trolley can be diverted from one rail track to another rail track connected to said first rail track.

SUMMARY OF THE INVENTION

The object of the invention is to obtain a conveying system of the above kind, wherein a reliable diversion from one rail track to the other rail track can be realized by simple means, if desired.

According to the invention this may be achieved in that said trolley or the like is provided with two guide means, which are arranged some distance apart, as seen in the intended direction of movement of a trolley along a rail track, and which cooperate during operation with a fixed guide means extending in the longitudinal direction of a rail track, while said trolley is furthermore provided with two further guide means, which are arranged some distance apart, as seen in the intended direction of movement of a trolley along a rail track, and which are furthermore arranged in staggered relationship with respect to each other, transversely to the intended direction of movement, for cooperation with guide means, which form part of said switch device, for diverting said trolley from one rail track to the other, which guide means are disposed near the connection between said two rail tracks.

Another aspect of the invention relates to a conveying system provided with a rail system and with a trolley or the like, which is movable along said rail system.

When using a conveying system of this type it is often desirable to decelerate and/or stop a trolley or the like moving along the rail system at a certain speed.

In order to accomplish this objective the conveying system is according to the invention provided with a slowing-down mechanism comprising a decelerating means in the form of a plurality of magnetic blocks of alternating polarity present on a support, and a decelerating means in the form of an aluminium reaction plate, whereby one decelerating means is connected with the trolley or the like and the other decelerating means is connected with the rail system, and whereby at least one of said decelerating means is movably disposed so as to be able to move in the direction of the other decelerating means when the two decelerating means are positioned near each other.

In this manner it is possible to obtain an effective deceleration of a trolley or the like, which is movable along the rail system, whereby said deceleration adjusts itself to the speed and the moving mass respectively of the trolley or the like, in such a manner that a greater braking force will be exerted as the speed is higher or the mass is greater.

The invention furthermore relates to a conveying system provided with a rail system and with a trolley for accommodating goods, which is movable along said rail system, whereby said rail system is in at least one discharge station for discharging goods from said trolley provided with means for placing at least one supporting surface supporting said goods in a sloping position, such that any goods present on said trolley can slide from the trolley through an outlet opening, transversely to the direction of movement of the trolley during operation, while at least one closing means is provided, by which said outlet opening can be opened or closed, at least in the discharge station.

When using a construction of this type the discharge or not of goods present on the trolley can be controlled in a simple manner in that the outlet opening is either opened or not.

BRIEF DESCRIPTION OF THE DRAWINGS

The invention will be explained in more detail with reference to the accompanying Figures.

FIG. 1 is a diagrammatic perspective view of a part of the conveying system according to the invention.

FIG. 2 is a larger-scale view of the switch portion that is encircled at II in FIG. 1.

FIG. 3 is a larger-scale view of a switch tongue forming part of the switch device.

FIG. 9 is a diagrammatic perspective view of a part of the conveying system, at the point where two rail tracks meet.

FIG. 10 is a larger-scale view of the encircled portion X in FIG. 9.

FIG. 11 is a diagrammatic perspective view of a discharge station, where the contents of a trolley can be discharged from the trolley.

FIG. 12 shows a mechanism for driving the trolley near the discharge station.

FIG. 13 shows another embodiment of a mechanism for driving the trolley near the discharge station.

FIG. 18 diagrammatically shows an arrangement for slowing down a trolley.

FIG. 19 is a plan view of a part of FIG. 16.

FIGS. 20 and 21 show variants of the embodiment according to FIG. 18.

DESCRIPTION OF THE PREFERRED EMBODIMENTS

Figure 4:
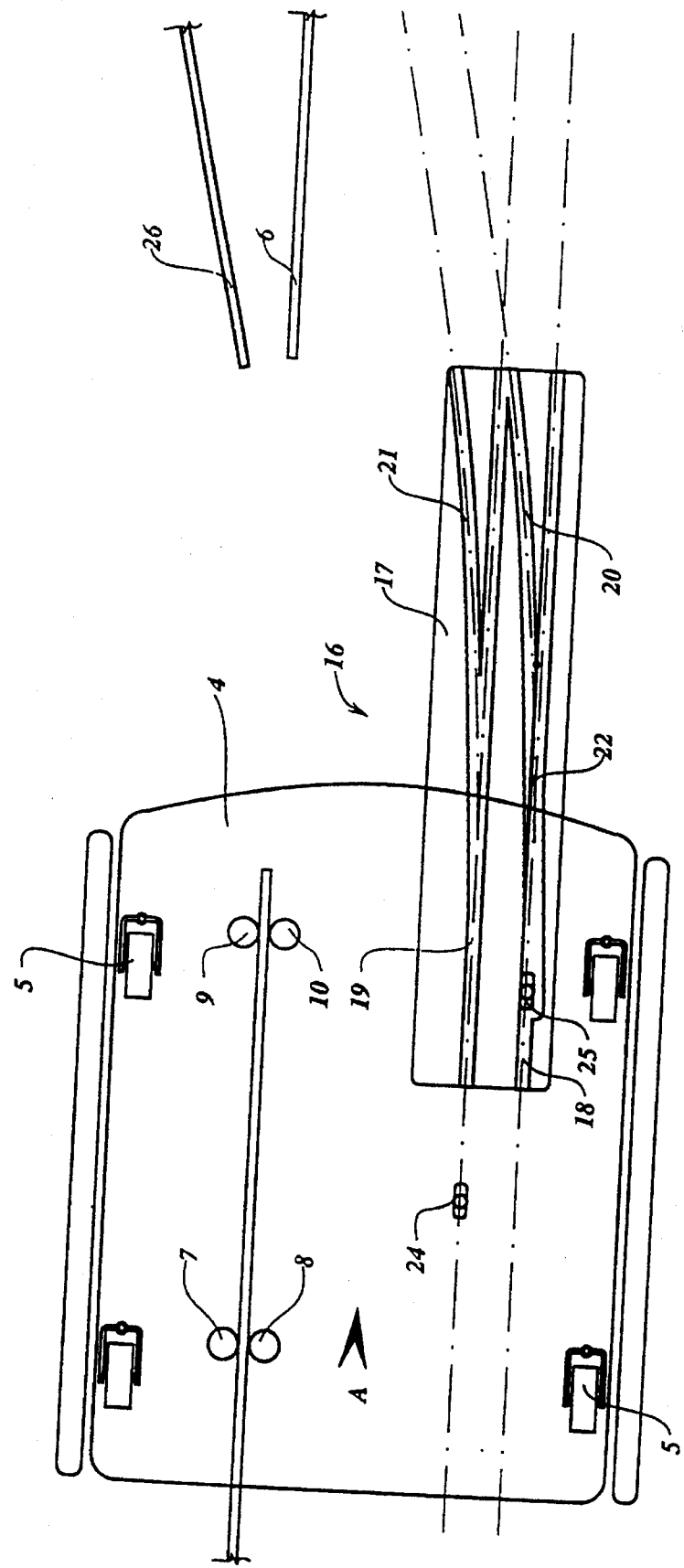
FIGS. 4 and 5 are diagrammatic bottom views of a trolley, with a switch device sketched in, when the trolley passes the switch device without being diverted from one rail track to another rail track by the said switch device.

The conveying system shown in FIG. 1 comprises a first rail track 1, which comprises a pair of rails 2 and 3 extending parallel to each other.

A trolley 4 is movable over said rails. The trolley 4 is thereby supported by four self-adjusting running wheels 5 (FIG. 4) provided at its bottom side, which roll over the upper surfaces of the rails 2 and 3.

In order to ensure that the trolley 4 keeps moving in the longitudinal direction of the rails 2 and 3 thereby, a guide means 6 is provided between the rails, said guide means being formed by a strip-shaped means extending parallel to the longitudinal direction of the rails. Said strip-shaped means 6 cooperates with two guide means arranged some distance apart in the intended direction of movement of the trolley according to arrow A, which are each formed by a pair of rollers 7, 8 and 9, 10 respectively, and which are rotatable about upwardly extending axes of rotation. The arrangement is thereby such that when the trolley 4 moves along rails 2 and 3 both rollers 9 and 10 of the one guide means and rollers 7 and 8 of the other guide means will be positioned on either side of the guide means formed by the elongated strip 6, such that the trolley 4 can only move in the longitudinal direction of the rails 2 and 3. Linear motors 11, which are known per se, may be provided for driving the trolley 4.

A conveying system of this type may for example be used at airports for conveying the luggage 12 of air passengers.

Generally the luggage or the trolley are thereby provided with electronically read codes, by means of which the trolley can be transported to a predetermined station. For that purpose additional rail tracks 13 are connected to the main rail track 1, generally at several points, via which a trolley may for example be guided to a predetermined station so as to deliver the luggage 12. Such an additional rail track 13 is again provided with a pair of rails 14 and 15 extending parallel to each other, which correspond with the rails 2 and 3.

A switch device 16 is provided near the connection of the rail track 13 to the rail track 1 for diverting a trolley from the rail track I to the rail track 13. The switch device 16 comprises a plate-shaped means 17 arranged between the rails 2 and 3, in which guide grooves 18 and 19 extending parallel to the longitudinal direction of the rails 2 and 3 are provided. Guide grooves 20 and 21 respectively provided in the plate 17, which include an angle with the guide grooves 18 and 19, are connected to said grooves 18 and 19 between the ends of said grooves. A switch tongue 22 is disposed near the end of the connection of the guide groove 20 to the guide groove 18, said switch tongue at its downstream end, as seen in the intended direction of movement of a trolley 4 according to arrow A, being pivotal to and fro in the direction of arrow B, by suitable setting means 22", about an upwardly extending pivot pin 22'.

As is furthermore diagrammatically illustrated in FIG. 3 the switch tongue 22 can furthermore pivot from its normal operating position, against the action of a spring, about a substantially horizontally extending pivot pin 23 provided near the upper end of pivot pin 22', for a purpose yet to be described in more detail hereafter.

With a view to cooperating with the guide means formed by the guide grooves 18–20 the trolley is provided with additional guide means, which are formed by cams 24 and 25 secured to the bottom side of the trolley, which cams are connected to the trolley, being freely rotatable about axes of rotation extending perpendicularly.

As will be apparent from FIGS. 4–8, cam 25 is thereby arranged some distance before cam 24, as seen in the intended direction of movement according to arrow A, while cams 24 and 25, as seen in the direction of movement according to arrow A, are staggered relative to each other, in a direction transversely to the intended direction of movement according to arrow A.

Near the switch device the strip-shaped guide means 6 is interrupted, in order to be able to divert trolley 4 from rail means 1 to rail means 13.

Figure 5:
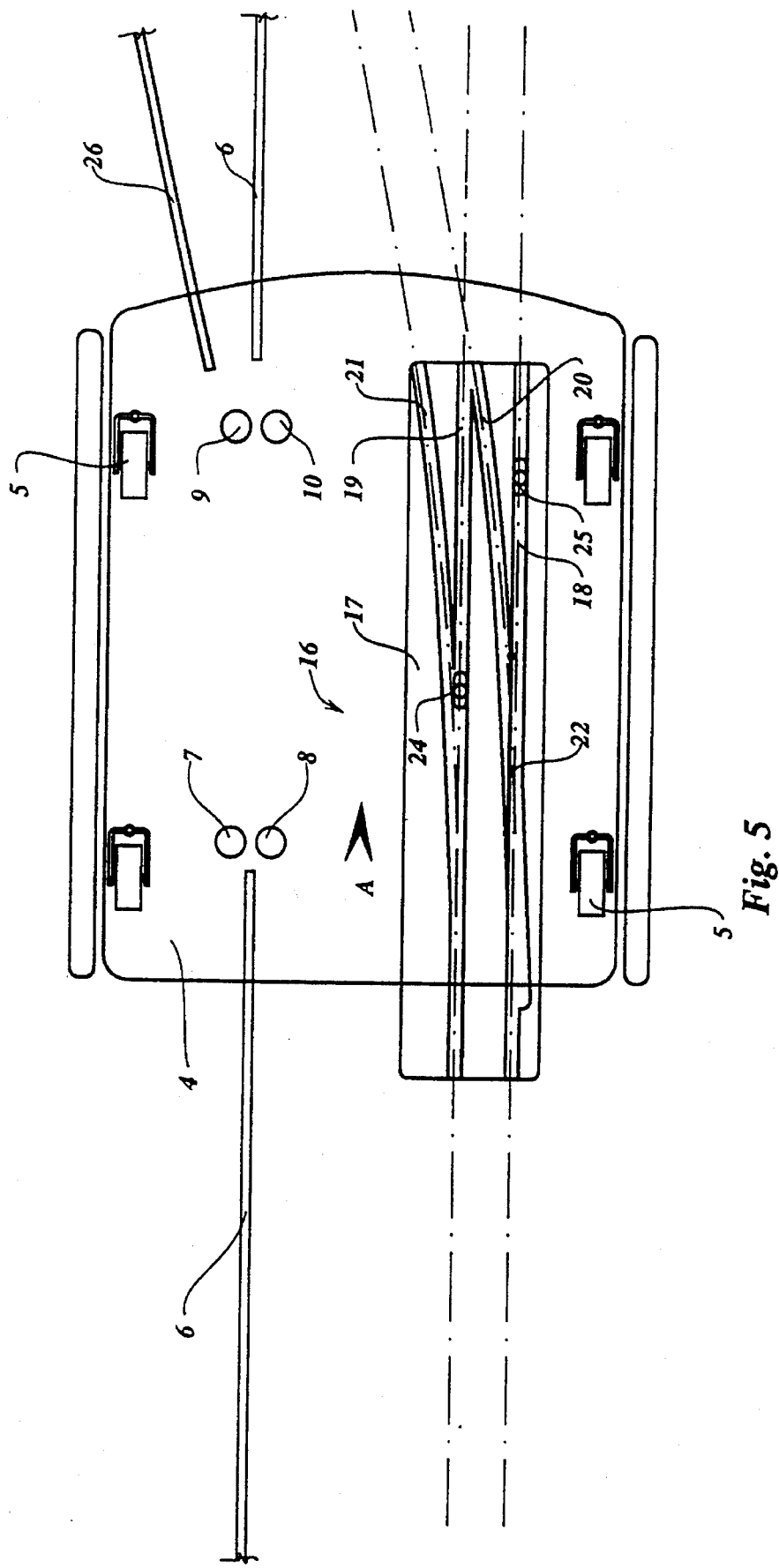
Figure 6:
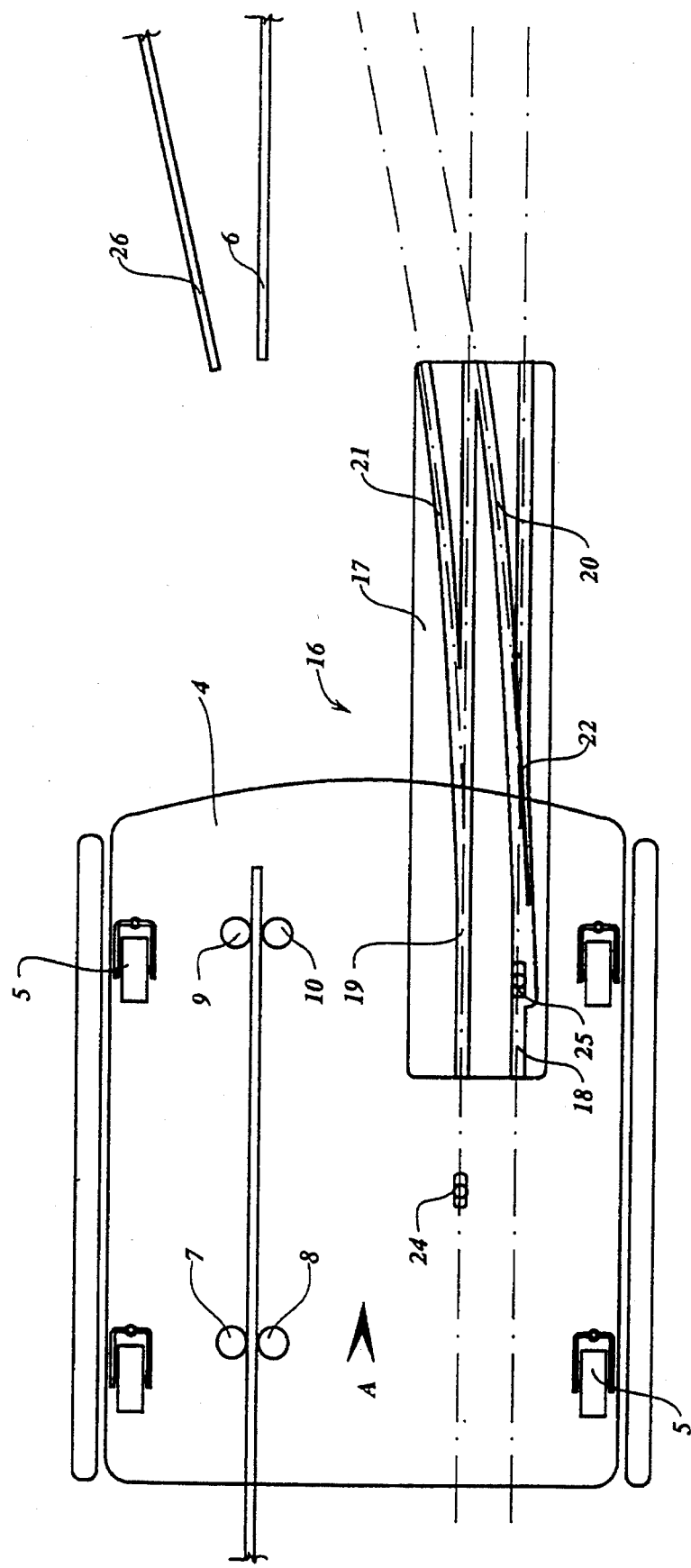
FIGS. 6–8 show various stages during the diversion of a trolley from one rail track to another rail track.
Figure 7:
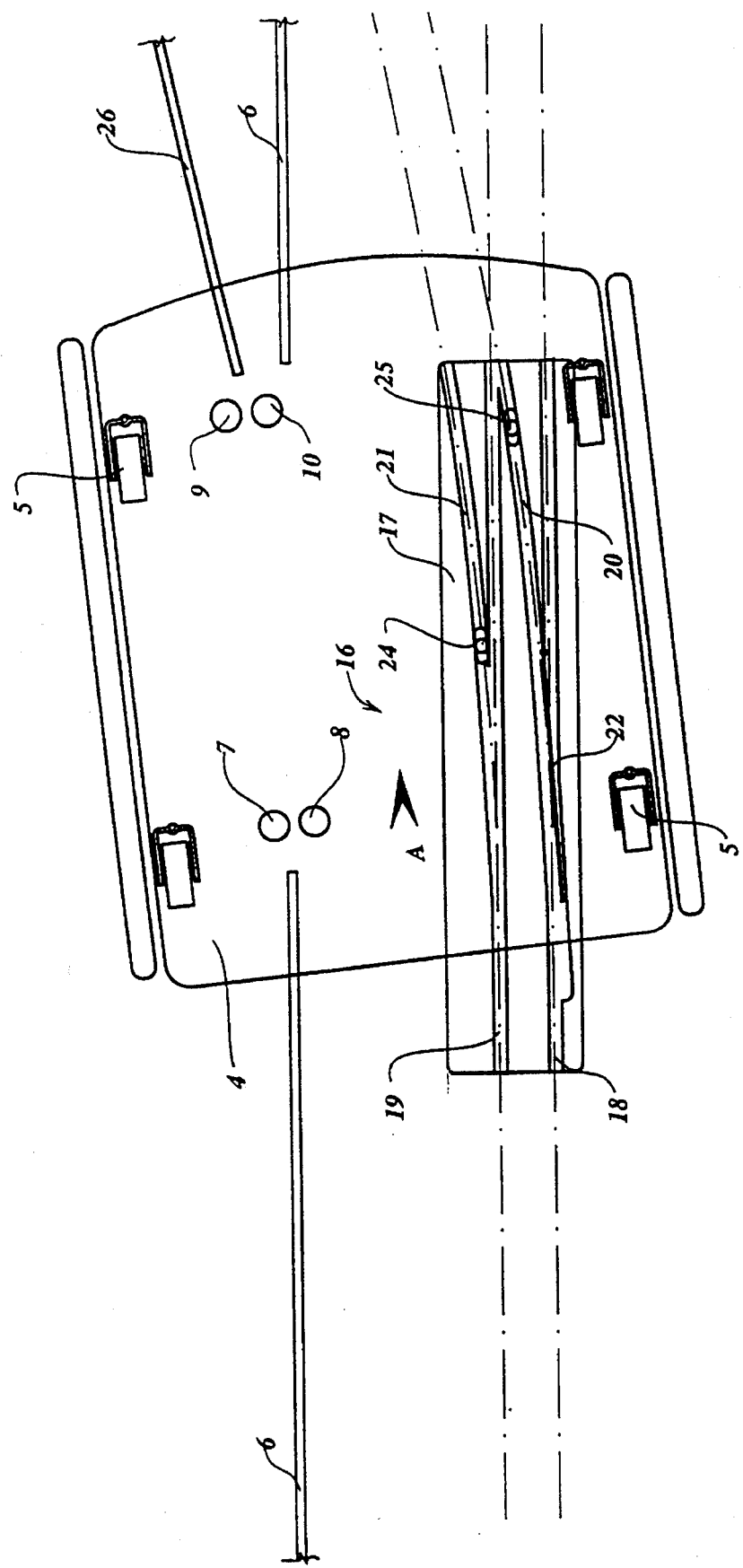

When the trolley 4 is to stay on rail track 2 near the connection of rail track 13 to rail track 1, the switch tongue 22 will take up a position in which the switch tongue 22 blocks the access to guide groove 20. Near the switch device 16 the guide cams 24 and 25 will guide the trolley in the longitudinal direction of the rail track 1, since the guide cams 24 and 25 forming guide means move through the guide grooves 18 and 19 forming guide means, as is shown in FIGS. 4 and 5. By means 5 of the guide cams 24 and 25 the trolley 4 is thus caused to follow the track 1, in spite of the fact that the guide means formed by the rollers 7, 8 and 9, 10 respectively have lost contact with the guide means formed by the strip-shaped means 6 upon passing the switch device.

When the trolley is to be diverted from rail track 1 to rail track 13, setting means 22" will move the switch tongue 22 to a position in which the switch tongue 22 releases the access to the guideway 20 and blocks the access to the downstream part of the guide groove 18 located past the switch. Upon passing the switch device 16 the front guide cam 25 will be able to move within the guide groove 18 along a certain distance and will subsequently be diverted into the guide groove 20 by the switch tongue 22. At the moment when the front guide cam 25 arrives at the switch tongue 22, the front rollers 9 and 10 have already lost contact with the guide strip 6, as will be apparent from FIG. 6. Upon further movement of the trolley 4 said trolley 4 is thus guided by cam 25 and the two rollers 7 and 8.

Figure 8:
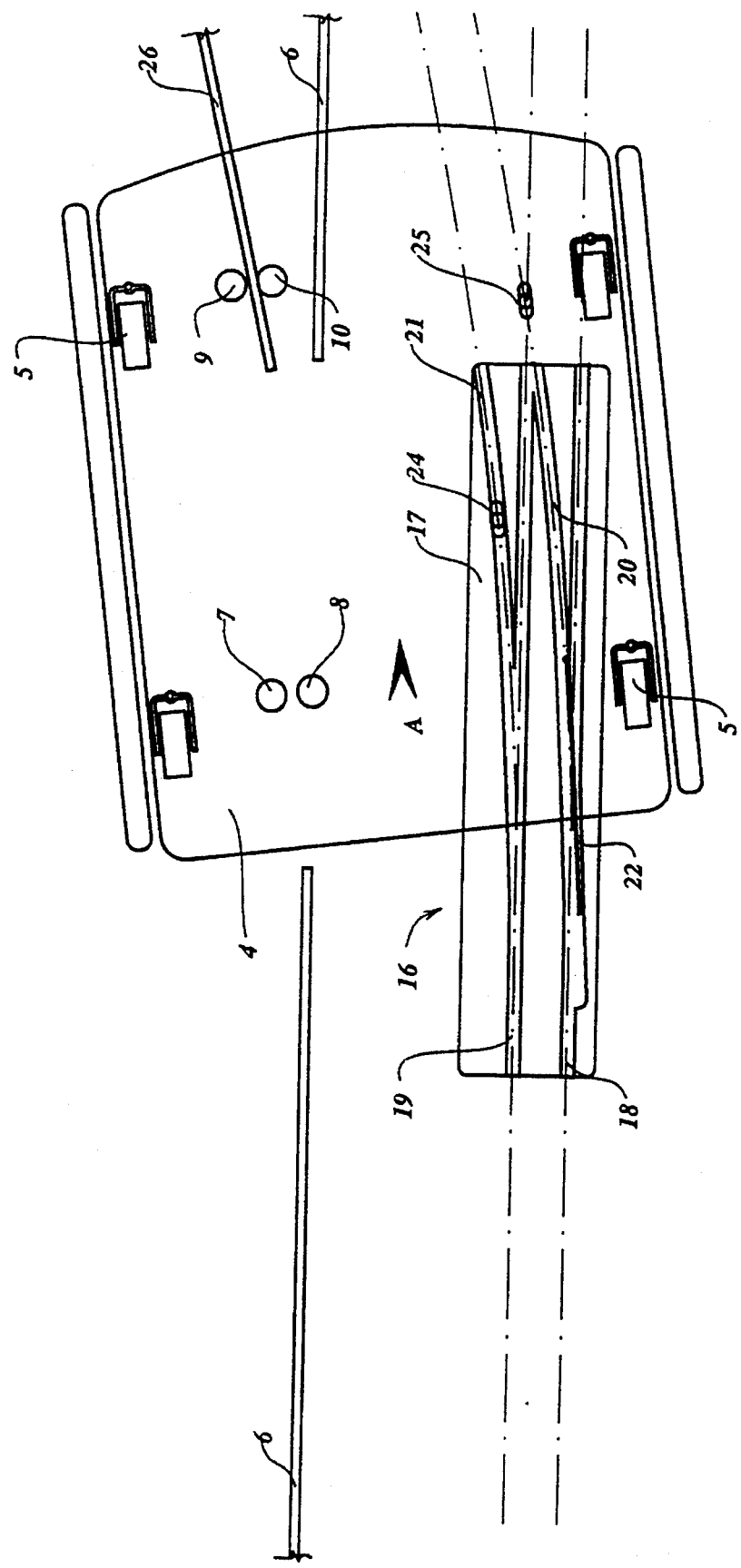

At some point of time also cam 24 will first move through the upstream part of the guide groove 19 initially, and then be guided into the guide groove 21, whereby the trolley 4 pivots about the axis of the connecting line between rollers or wheels 7 and 8, , as it were, while the guide rollers 7 and 8 lose contact with guide means 6, so that at some point of time during the diversion of the trolley from rail track 1 to rail track 13 said trolley 4 is only guided by the two guide rollers 24 and 25 moving through the guide grooves 20 and 21, as is illustrated in FIG. 8. At some point of time the guiding of the trolley will be taken over again by the guide means formed by rollers 9 and 10 and subsequently also by rollers 7 and 8, which will cooperate with a strip-shaped guide means 26 corresponding with strip-shaped guide means 6, which extends parallel to and between the rails 14 and 15.

If the cam 25 would strike the tip of the switch tongue, whose height gradually increases, as a result of the switch tongue not having reached an intended end position yet, the cam 25 may run onto the rounded upper edge of the switch tongue, whereby the tongue is pivoted about the pin 23. At some point of time the cam will thereby fall from the rounded upper edge of the tongue, as a result of which jamming of the trolley 4 in question will be prevented.

A simple switch means may be used for guiding the trolley back from rail track 13 to rail track 1, said switch means being diagrammatically illustrated, more particularly in sectional view, in FIG. 10. As appears from this Figure said switch means 27 comprises a plate-shaped part 28, in which guide grooves 29 and 30 being in line with rail track 1 are provided for guiding guide cams of trolleys 4 moved along rail track 1. Furthermore curvilinear guide grooves 31 and 32 are provided, which guide the guide cams 24 and 25 of a trolley coming from rail track 13 when the trolley in question is being diverted from rail track 13 to rail track 1.

Rail track 13 may for example lead to a discharge station 33, as is diagrammatically illustrated in FIG. 11. In the embodiment illustrated in said Figure an upwardly curved rail portion 34 is provided on the rail 14, so that during the movement of the trolley 4 over the rail track 7 said trolley 4 can be moved to such a position, that the surface 35 supporting the luggage will take such an inclined position that the luggage 12 will slide from the trolley under the influence of gravity, and will be received on for example a conveyor belt 36 or the like for the further discharge of the luggage.

It will be apparent that the construction may also be such that an elevated portion is provided on the rail 15, so that the luggage is delivered on the side of the rail track 13 opposite the side shown in FIG. 11. Furthermore the curved rail portion 34 may be a downwardly curved rail portion.

In order to be able to drive the trolley 4 positively in the discharge station 33, a bar-shaped means 37 extending parallel to the intended direction of movement is secured to the frame of the trolley 4, said bar-like means 37 near the discharge station 33 being guided by a plurality of spaced-apart guide rollers 38 or the like (FIG. 12) extending above said bar-like means. The upper part of a driven endless conveyor belt 39 extending parallel to said bar-like means engages on the bottom side of the bar-like means 37. In order to ensure a satisfactory contact between the upper part of the endless conveyor belt 39 and the bar-like means 37 supporting rollers 40 are provided under the upper part of the endless conveyor belt 39.

In another embodiment an endless conveyor belt or chain may be used, to which supporting rollers are secured, which run over a guideway.

FIG. 13 shows a variant to the embodiment of FIG. 12, wherein the same reference numerals are used for those parts in FIG. 13 that correspond with the parts illustrated in FIG. 11.

In the embodiment of FIG. 13 a number of rollers 41, which can be driven during operation, are arranged one behind the other, said rollers engaging on the bottom side of the bar-like means 37, as will be apparent from FIG. 13. The rollers 41 may thereby be driven from a single driving source (not shown) because the rollers are interconnected by means of chains or belts 42, as is diagrammatically illustrated in FIG. 13.

Dependent on the operating conditions, such as the weight of the trolley 4, the weight of the cargo on trolley 4, the steepness of the curved rail etc., spring-loaded rollers 38 may or may not be used.

Figure 14:
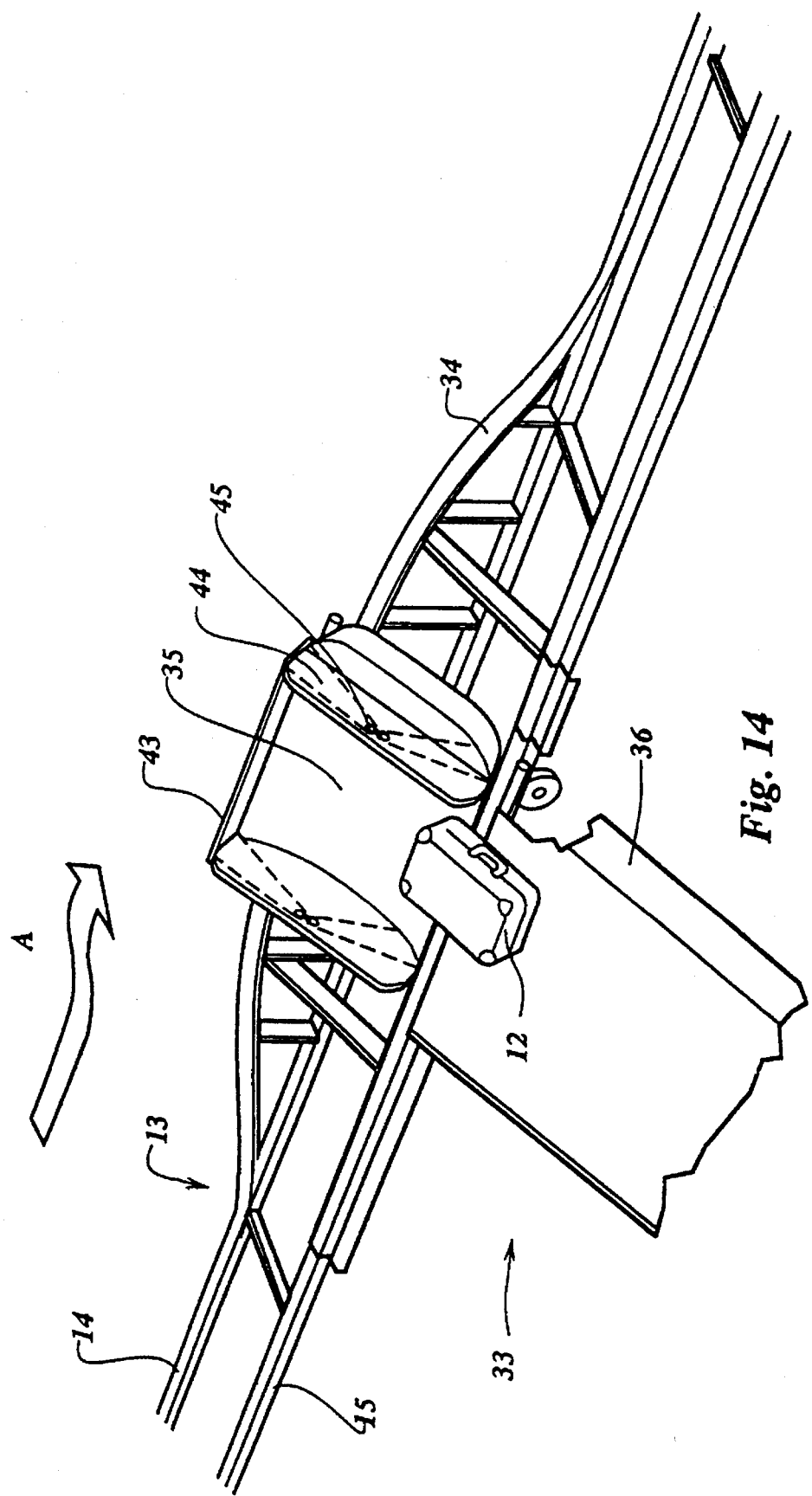
FIGS. 14–17 show variants of the embodiment according to FIG. 11.
Figure 15:
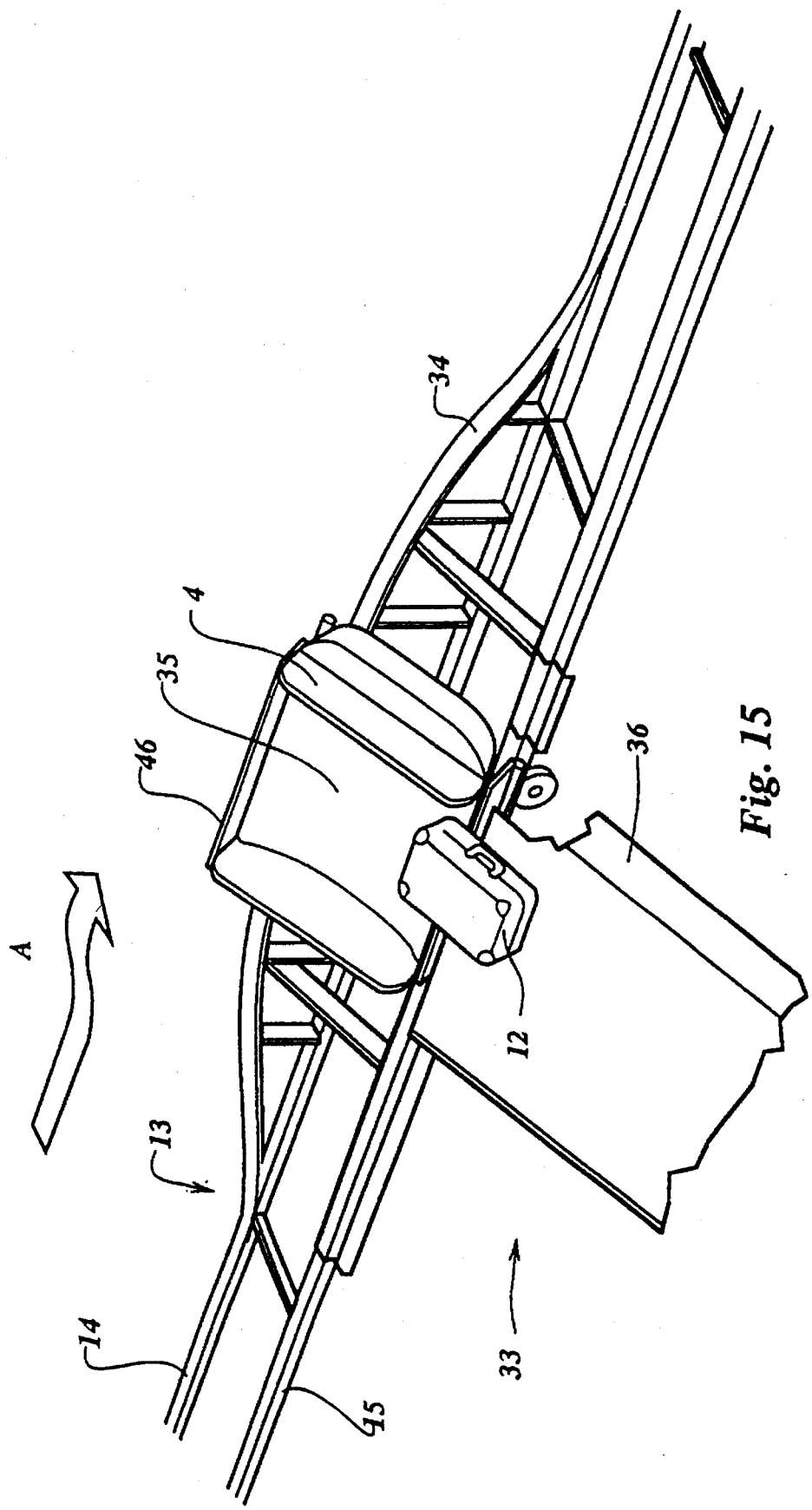
Figure 16:
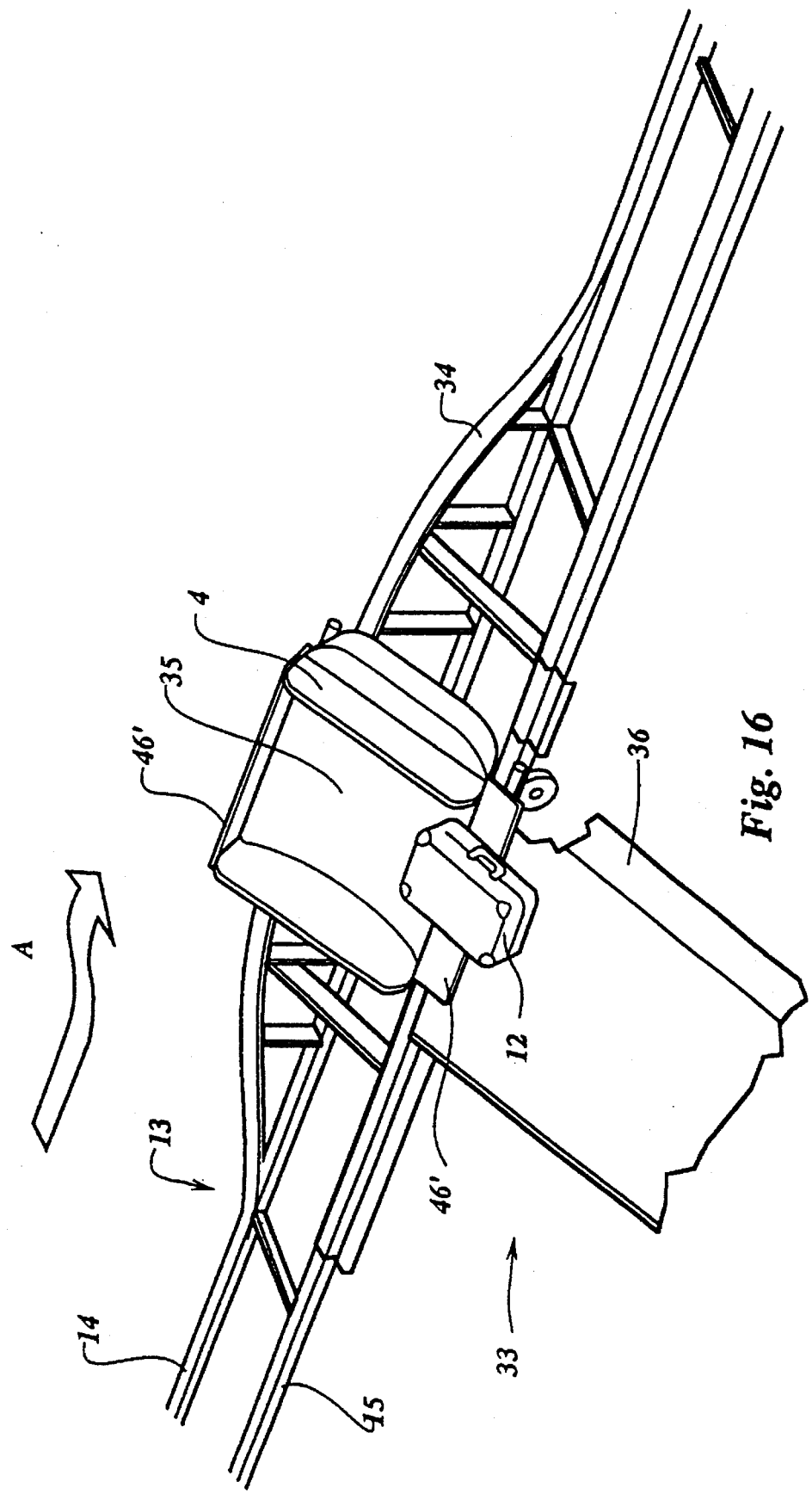

FIGS. 14–16 show a few variants to the embodiment according to FIG. 10 and consequently like parts are numbered alike the various Figures.

As will be apparent from FIG. 11 the space in the trolley 4 for accommodating the luggage 12 is open at the opposite sides, so that the luggage will slide from the trolley under the influence of gravity when at least the supporting surface 35 of the trolley is tilted.

It may be desirable, however, to provide a possibility of stopping the luggage when passing a discharge station, so as to discharge said luggage in a discharge station located further downstream.

In the embodiment of FIG. 14 a flap 43 is provided near each end of supporting surface 35 for that purpose, said flap being pivotally coupled to the trolley by means of arms 44 and pivot pins 45 extending parallel to the intended direction of movement of the trolley. The flap 43 may thereby be pivoted, for example by guide means (not shown) provided along the rail track 13 or by setting means (not shown), between an upwardly pivoted position shown at the top of FIG. 14, in which the opening located near that end of the supporting surface 35 is closed, and a position shown near the bottom end of the trolley in FIG. 14, in which the opening of the cargo space of the trolley located near the conveyor belt 36 is released and the luggage can slide from the cargo space of the trolley 4 in the manner shown in FIG. 14.

FIG. 15 shows a similar embodiment, wherein closing means or walls 46 capable of upward and downward movement are provided near opposite sides of the trolley, which closing means or walls can be moved upward and downward by guide means or setting means.

FIG. 16 shows an embodiment wherein flaps 46' are provided near the ends of the supporting surface, said flaps being capable of pivoting movement about pivot pins located near their bottom ends, between a closed position and an open position, in which said flap 46' extends over the conveyor belt 36.

Figure 17:
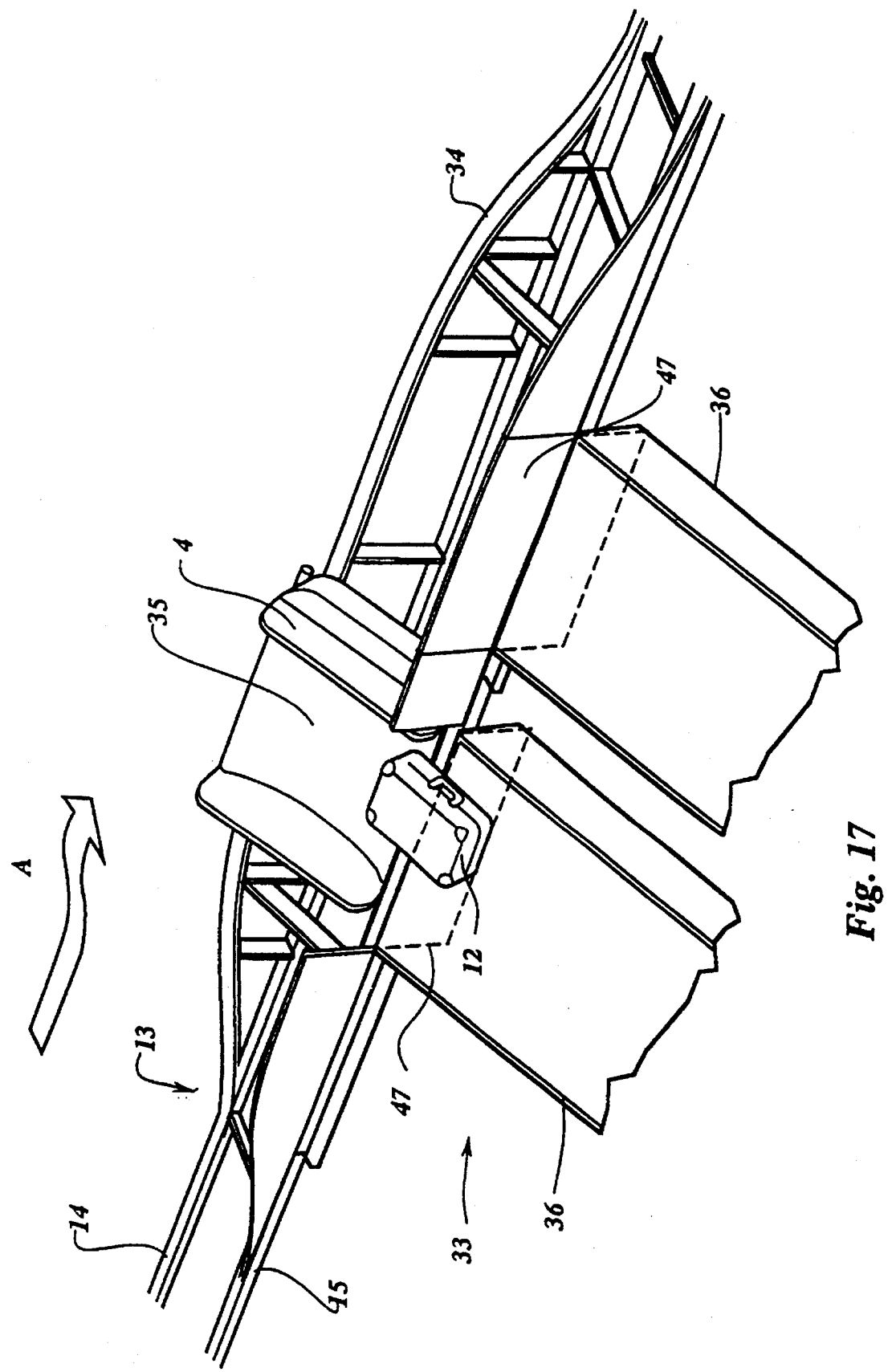

In the embodiment according to FIG. 17 a slide or closing means 47 capable of upward and downward movement is provided near the end of a conveyor belt 36 or the like connecting to the rail track 13, which slide or closing means 47, as will be apparent from FIG. 15, may be moved to a first downward position, in which the opening of a trolley passing the respective station is released and the luggage or the like can thus slide from the trolley, and to a second position shown on the right in FIG. 17, in which the closing means 47 moved to its upward position will prevent material present on a passing trolley 4 from being discharged.

A discharge station 32 may comprise one or more discharge conveyors.

During operation it will furthermore be frequently desirable to slow down a moving trolley 4. The slowing-down mechanism diagrammatically shown in FIGS. 18 and 19 may be used for this purpose.

Said slowing-down mechanism comprises a first decelerating means in the shape of an aluminium reaction plate 48, which is secured against the bottom side of an iron supporting plate 49 forming part of the trolley 4.

A further decelerating means of the slowing-down mechanism according to the invention comprises a supporting plate 50, to the bottom side of which two downwardly extending rods 51 are secured. Guide pieces 52 secured to the bottom ends of the rods 51 are guided in guide slots 53 sloping upwards in the intended direction of movement of the trolley according to arrow A.

A large number of magnetic blocks of alternating polarity are provided on top of the supporting plate 50, as will be apparent in particular from FIG. 19, which shows a top view of the supporting plate 50 and the magnetic blocks 54 secured thereto.

When a trolley 4 moves over the supporting plate 50 and the magnetic blocks secured thereto, in the direction according to arrow A, electric currents will be induced in the aluminium plate 48. The magnetic field will thereby be conducted by the iron plate 49.

As a result of the electric currents electromagnetic fields will be created, which cause north and south poles to be formed on the aluminium reaction plate as well. Said north and south poles exert a force of attraction on the north and south poles present on the supporting means 50, which results in a decelerating force being exerted on the trolley 4.

Under the influence of the generated braking force also the supporting means 50 with the magnetic blocks secured thereto will tend to move upwards to the position illustrated in dotted lines in FIG. 18, however. As a result of ths the air gap between the aluminium plate 48 and the upper surfaces of the magnetic blocks 54 will become smaller, which results in an increased braking force being exerted on the trolley 4.

The braking force thus adjusts itself depending on the velocity of the trolley and/or of the moving mass of the trolley 4. A more heavily loaded trolley 4 will tend to maintain its higher speed longer, so that a stronger magnetic field is generated and the supporting plate 50 will thus move further upwards, resulting in a greater increase in the braking force.

Possibly a spring mechanism 55 may be provided between the movable supporting means 50 and the fixed frame of the device, by means of which mechanism the movement of the supporting means 50 may be influenced.

Generally it will be preferred for the movable slowing-down mechanism 50 to be disposed at a fixed location, so that the various trolleys only need to be fitted with an aluminium plate 48 on a steel support. If desired, however, the movable means may also be provided on the trolley and the combination of the thin aluminium plate with the iron supporting plate may be disposed at a fixed position along the path of the trolley 4.

The upward and downward movement of the movable decelerating means may also be effected in some other manner, of course.

In the embodiment according to FIG. 20 the supporting means 50 is thus supported by means of a pair of leaf springs 56 sloping upwards in parallel relationship, said leaf springs allowing an upward and downward movement of the supporting means 50 by deformation of the leaf springs, as will be apparent from FIG. 20.

FIG. 21 shows an embodiment wherein two coupling rods 57 are pivotally coupled to the bottom side of the supporting plate 50. The ends of the coupling rods 57 remote from the supporting plate 50 are pivotally coupled in fixedly disposed pivot points 58. From FIG. 21 it will be apparent that the supporting plate 50 can be caused to move upwards and downwards by pivoting of the rods 57. The lowermost position of the supporting plate 50 is thereby determined by a stop 59 cooperating with one of said rods 57. Also in this embodiment a spring mechanism 60 may be provided for influencing the upward and downward movement of the supporting plate 50.

We claim:

1. A conveying system, which comprises:

a rail system and a trolley accommodating goods, said trolley being movable along said rail system, wherein said rail system includes at least one discharge station discharging goods from said trolley, said discharge station having means for placing at least one supporting surface supporting said goods in a sloping position, such that goods present on said trolley are slidable from the trolley through an outlet opening of the trolley, transversely to a direction of movement of the trolley during operation, and at least one closing means is provided for opening and closing the outlet opening, at least in the discharge station;

drive means for driving said trolley wherein said means includes bar shaped means connected to said trolly;

conveyor means for engaging said bar shaped means and conveying said trolley in said direction of movement; and a plurality of spring loaded rollers which engage said bar shaped means wherein said conveying means comprises an endless belt.

2. A conveying system according to claim 1, wherein said closing means is connected to said trolley.

3. A conveying system according to claim 1, wherein said closing means is connected to said trolley and is vertically adjustable.

4. A conveying system according to claim 1, wherein said closing means is pivotally coupled to said trolley.

5. A conveying system according to claim 1, wherein said closing means is disposed in said discharge station.

6. A conveying system according to claim 1, wherein the rail system is disposed at an angle with respect to horizontal in said discharge station.

7. A conveyor system as claimed in claim 1, wherein said conveying means comprises at least one driven roller.

8. A conveying system, which comprises:

a rail system;

a trolley positioned on said rail system and accommodating goods therein, said trolley being movable along said rail system, wherein said rail system includes at least one discharge station discharging goods from said trolley, said discharge station having at least one supporting surface supporting said goods in a sloping position such that goods present on said trolley are slidable from said trolley through an outlet opening of the trolley, transversely to a direction of movement to the trolley, during operation;

at least one closing mechanism opening and closing the outlet opening of the trolley, at least in the discharge station;

a drive mechanism driving said trolley wherein said drive mechanism includes a bar shaped mechanism connected to said trolley;

a conveyor engaging said bar shaped mechanism and conveying said trolley in said direction of movement; and a plurality of spring loaded rollers which engage said bar shaped mechanism wherein said conveyor comprises an endless belt.

9. A conveying system as claimed in claim 8, wherein said conveyor comprises an endless belt which includes support rollers contacting the endless belt with said bar shaped mechanism.

10. A conveying system according to claim 8, wherein said closing mechanism is connected to said trolley.

11. A conveying mechanism according to claim 8, wherein said closing mechanism is connected to said trolley and is vertically adjustable.

12. A conveying system according to claim 8, wherein said closing mechanism is pivotably coupled to said trolley.

13. A conveying system according to claim 8, wherein said closing mechanism is disposed in said discharge station.

14. A conveying system according to claim 8, wherein the rail system is disposed at an angle with respect to horizontal in said discharge station.

\* \* \* \* \*